(12) United States Patent
Gross

(10) Patent No.: US 11,847,498 B2
(45) Date of Patent: Dec. 19, 2023

(54) MULTI-REGION DEPLOYMENT OF JOBS IN A FEDERATED CLOUD INFRASTRUCTURE

(71) Applicant: HashiCorp, San Francisco, CA (US)

(72) Inventor: Timothy Gross, San Francisco, CA (US)

(73) Assignee: HashiCorp, San Francisco, CA (US)

( * ) Notice: Subject to any disclaimer, the term of this patent is extended or adjusted under 35 U.S.C. 154(b) by 334 days.

(21) Appl. No.: 17/370,448

(22) Filed: Jul. 8, 2021

(65) Prior Publication Data

US 2023/0014635 A1    Jan. 19, 2023

(51) Int. Cl.
    *G06F 9/46*    (2006.01)
    *G06F 9/50*    (2006.01)
    *G06F 11/30*   (2006.01)

(52) U.S. Cl.
    CPC ............ *G06F 9/5038* (2013.01); *G06F 9/505* (2013.01); *G06F 9/5055* (2013.01); *G06F 9/5077* (2013.01); *G06F 11/3017* (2013.01)

(58) Field of Classification Search
    CPC ...... G06F 9/5038; G06F 9/505; G06F 9/5055; G06F 9/5077; G06F 11/3017
    See application file for complete search history.

*Primary Examiner* — Gregory A Kessler
(74) *Attorney, Agent, or Firm* — FisherBroyles LLP; James P. Cleary

(57) ABSTRACT

A system and method for multi-region deployment of application jobs in a federated cloud computing infrastructure. A job is received for execution in two or more regions of the federated cloud computing infrastructure, each of the two or more regions comprising a collection of servers joined in a raft group for separate, regional execution of the job generating a copy of the job for each of the two or more regions. The job is then deployed to the two or more regions, the workload orchestrator deploying the job according to a deployment plan. A state indication is received from each of the two or more regions, the state indication representing a state of completion of the job by each respective region of the multi-cloud computing infrastructure.

18 Claims, 5 Drawing Sheets

```
multiregion {
    strategy {
        max_parallel = 1
        on_failure = "fail_all"
    }
    region "west" {
        count       = 2
        datacenters = ["west-1"]
        meta {
            "my-key": "W"
        }
    }
    region "east" {
        count       = 1
        datacenters = ["east-1", "east-2"]
        meta {
            "my-key": "E"
        }
    }
}
```

FIG. 4

MULTI-REGION DEPLOYMENT OF JOBS IN A FEDERATED CLOUD INFRASTRUCTURE

TECHNICAL FIELD

The subject matter described herein relates to cloud computing, and more particularly to multi-region deployment of jobs in a federated cloud infrastructure.

BACKGROUND

Enterprises deploy mission-critical applications to multiple geographic regions to meet business objectives of high-availability and performance, particularly in a dynamic infrastructure like a cloud computing platform. However, most cloud computing tools fall short of providing a way for users to coordinate deployments of a single job across multiple regions, so the burden of developing such tooling lands on operators, which can be very burdensome, especially in multi-cloud deployments.

In the case of some tools, such as a workload orchestrator like Nomad® by HashiCorp, for instance, each cluster has its own independent state store. This provides several advantages: 1) isolated failure domains—if a cluster crashes, has its state store corrupted, or loses network connectivity, the other clusters continue normally; 2) correctness: cross-cluster transactions are not needed (ex. a raft of rafts); 3) performance: decisions can be made within a small number of voting servers. However, this isolation between clusters also means that deployments cannot be adequately coordinated across multiple regions.

Users can automate this work themselves, however for each multi-region job, users need a job specification ("jobspec") for each region (or use a templating pipeline to create a jobspec for each region), run the deployment for each region, determine if it was successful, and then deploy to a next region(s). If a later deployment fails, there is no way to roll-back the other successful regions except to revert the jobspec to an earlier version, possibly re-running the templating pipeline, and then deploying it again. That "reverted" deployment is a new deployment and cannot take advantage of existing rollback feature of conventional workflow orchestration tools. Any "canaries," or limited deployments before widespread deployment, will need to be placed again. The job version index must be incremented and will therefore be out-of-step with the other clusters, forcing operators to track state between clusters.

SUMMARY

A system and method is described herein for multi-region deployment of jobs in a federated cloud infrastructure, including control over staged rollouts and rollbacks on failure within the federated cloud infrastructure.

In one aspect, a system and method for multi-region deployment of application jobs in a federated cloud computing infrastructure includes the step of receiving, by a workload orchestrator system of a multi-region cloud computing infrastructure, a job for execution in two or more regions of the multi-region cloud computing infrastructure. Each of the two or more regions includes a collection of servers joined in a raft group for separate, regional execution of the job. The method further includes the steps of generating, by the workload orchestrator system, a copy of the job for each of the two or more regions, and deploying, by a workload orchestrator server of the workload orchestrator system, the job to the two or more regions. The workload orchestrator server is configured to deploy the job according to a deployment plan. The method further includes receiving, by the workload orchestrator server, a state indication from each of the two or more regions. The state indication represents a state of completion of the job by each respective region of the multi-cloud computing infrastructure.

In another aspect, a system is presented for multi-region deployment of application jobs in a federated cloud computing infrastructure. The system includes a workload orchestrator system associated with the federated cloud computing infrastructure, the workload orchestrator system being configured to receive a job for execution in two or more regions of the multi-region cloud computing infrastructure, each of the two or more regions comprising a collection of servers joined in a raft group for separate, regional execution of the job, the workload orchestrator system further being configured to generate a copy of the job for each of the two or more regions. The system further includes a workload orchestrator server of the workload orchestrator system, the workload orchestrator server being configured to deploy the job to the two or more regions, and to deploy the job according to a deployment plan, the workload orchestrator server further being configured to receive a state indication from each of the two or more regions, the state indication representing a state of completion of the job by each respective region of the multi-cloud computing infrastructure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to multi-region deployment of jobs in a federated cloud infrastructure, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 shows an example of a multi-region deployment of a job, in accordance with implementations described herein.

When practical, similar reference numbers denote similar structures, features, or elements.

DETAILED DESCRIPTION

This document describes a system, method and computer program product for multi-region deployment of jobs in a federated cloud infrastructure, including control over staged rollouts and rollbacks on failure within the federated cloud infrastructure. As used herein, a "multi-region job" is a workflow by an application that is distributed across multiple computing systems situated in different geographical regions. Each computing system can include one or more server computers. One or more of the computing systems can include, and be managed by, a unified workload orchestrator such as specialized workflow server that manages workflow of the application across the multiple geographic regions.

Figure 1:
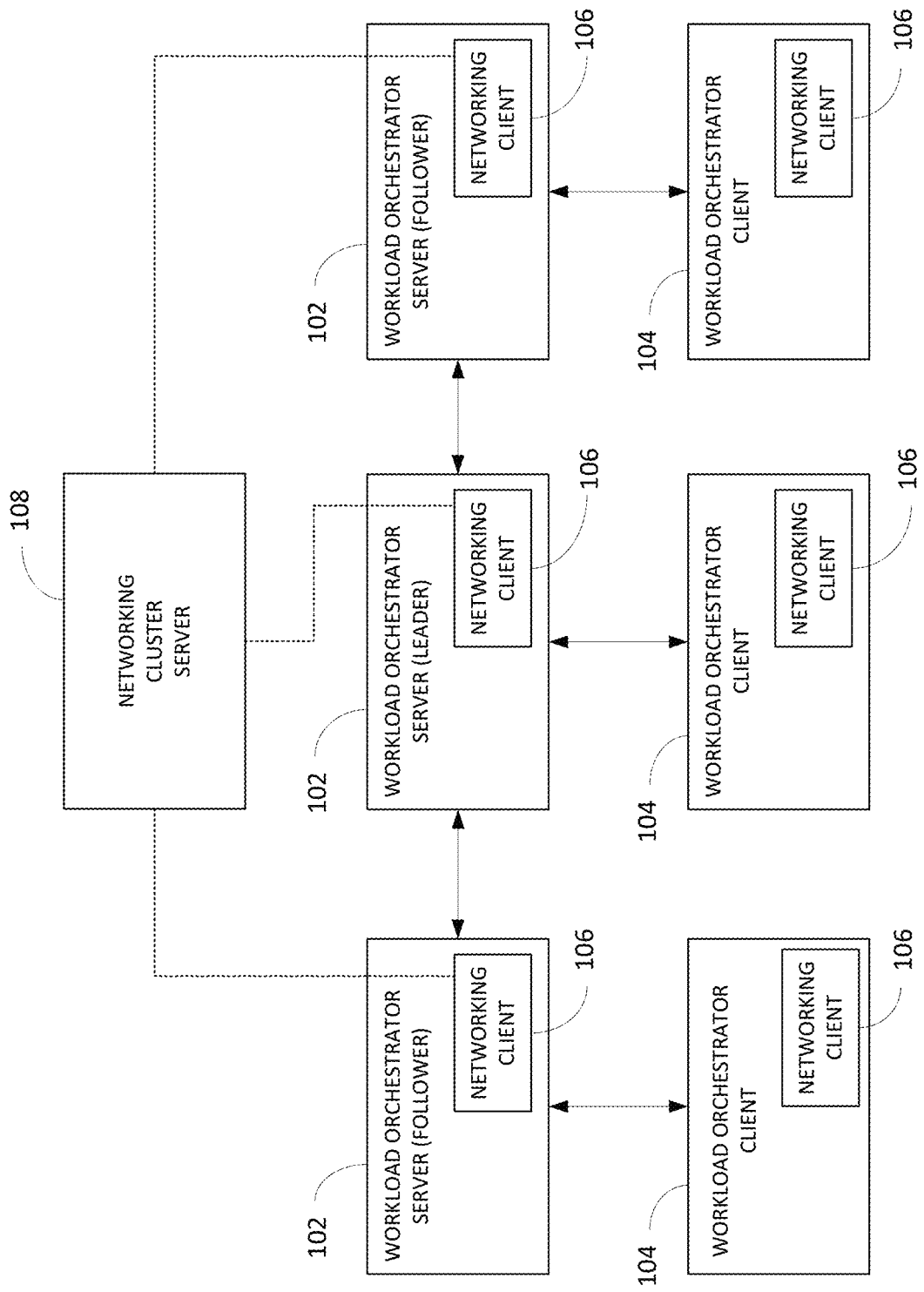
FIG. 1 illustrates a datacenter having a workflow orchestration system.

FIG. 1 illustrates a datacenter 100 having a workflow orchestration system, such as Nomad® by HashiCorp. The workflow orchestration system includes a number of workload orchestrator servers 102 and workload orchestrator clients 104, which are each integrated with a networking client 106 of a networking system and under control of a networking cluster server 108. The networking system, such as Consul® by HashiCorp, executes service discovery, network automation, and communication policies application functions for the workflow orchestration system, as well as identity-based security and access control.

One of the workload orchestrator servers 102 is designated as a leader, while the remaining workload orchestrator servers 102 are designated followers, as depicted in FIG. 1. The leader's purpose within a region is to ensure the durability of state by replicating it to followers.

The workload orchestration system described above can support federation between geographic regions to provide a foundation to achieve these objectives. Federation refers to the ability to unify computing infrastructure, platforms and software from disparate and usually geographically-separated datacenters. Federation enables users to submit jobs or interact with a hypertext transport protocol (HTTP) application programming interface (API) for targeting any region from any server, even if that server resides in a different region.

Figure 2:
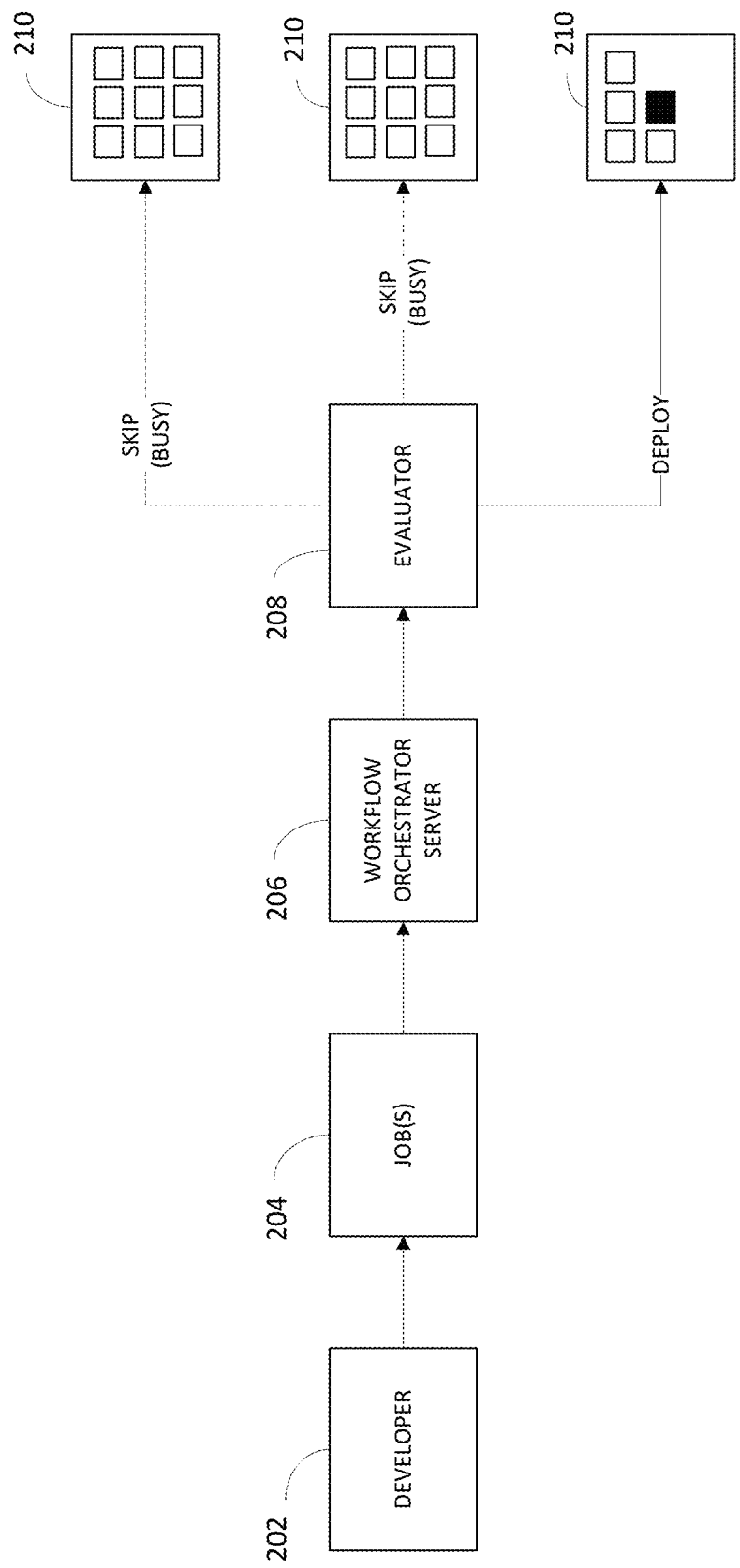
FIG. 2 illustrates operation of a workload orchestrator server in accordance with implementations described herein.

In the case of a workload orchestrator such as Nomad®, and as shown in FIG. 2, typically when a user (developer) 202 submits a job 204, a workload orchestrator server 206 (such as the workload orchestrator designated as leader as shown in FIG. 1) validates the jobspec and checks the user's access control lists (ACLs), etc. The workload orchestrator server 206 creates an evaluation, which results in a plan to be applied by an evaluator 208. An applied plan creates a deployment to one or more clusters 210 of virtual machines (unless the user specifies update.max_parallel=0, in which case no deployment is created). In one example, on the Nomad® leader, a deploymentwatcher goroutine monitors the progress of the deployment, and deployments can be paused, resumed, and promoted via nomad deployment subcommands.

Figure 3:
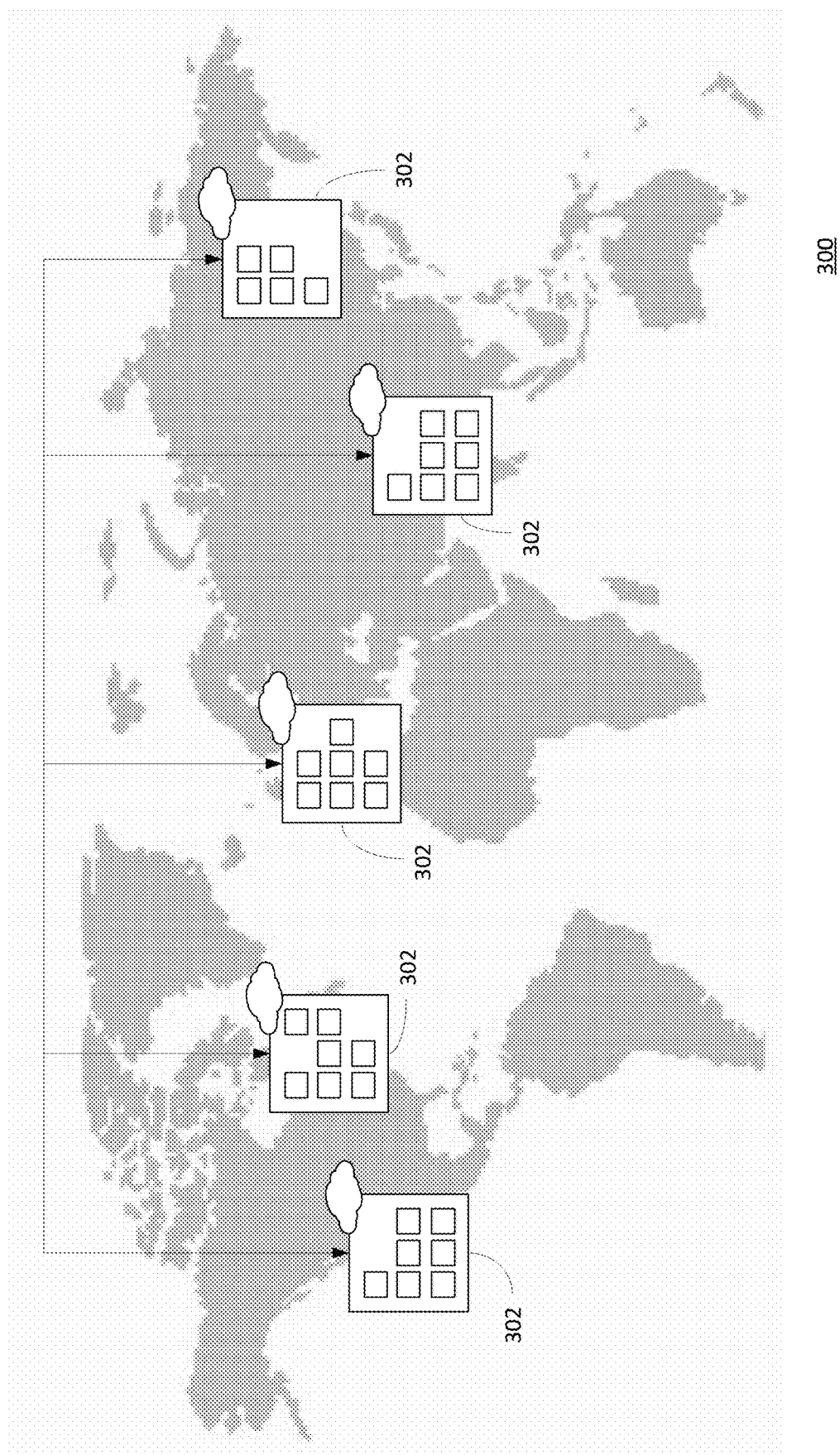
FIG. 3 illustrates a multi-region deployment architecture for deployment of mission-critical applications to multiple geographic locations.

FIG. 3 illustrates a multi-region deployment architecture 300 for deployment of mission-critical applications to multiple geographic locations. The multi-region deployment architecture 300 is also known as a federated cloud infrastructure, where each region includes a collection of servers 302 joined in what is known as a raft group; i.e. cloud computing servers operating according to a consensus algorithm that is configured for fault-tolerance and performance, as described above. Some other regions in the cloud infrastructure communicate over remote procedure calls (RPCs), and according to a gossip membership for inter-nodal communications, such as Serf® by HashiCorp, but which are not part of the raft group. (Note that the terms "cluster" and "region" are used interchangeably herein, but datacenter is distinct.)

The system and method described herein can be configured as a multi-region deployment so as to minimize cross-region coordination. Each region still maintains an entirely separate state store and raft group. Cross-region remote procedure calls (RPCs) can be used only during deployments, and not during steady-state operations. During a multi-region deployment, the "active" deployments are able to determine what region's deployment should be sent RPCs to pause/resume/rollback without coordination. To minimize opt-in complexity, the existing behavior for single region jobs is not impacted.

Once a multi-region job has been deployed, users are able to query the state of each region's version of the job as though it were a single-region job, but it is also evident when users are making queries or updates to multi-region jobs. The presently-disclosed systems and methods provide loose coupling, but an operator can intervene manually yet safely in a multi-region deployment. Accordingly, an operator can unblock a region's deployment in a case where a region's servers become unreachable in the middle of a deployment.

In accordance with the present disclosure, when a multi-region job is submitted, the job is copied into a Job.Register RPC specific to each region. When a region receives one of these jobs, it will go through the steps described above for a single-region job, resulting in a deployment in each region. The deploymentwatcher goroutine will determine when the state of a deployment has changed, compare it to the multi-region specification, and issue one or more Deployment.Pause or Deployment.Fail RPCs to kick off or rollback the deployments in the other regions as required. The details of this decision-making process is further described below.

In some implementations, a multiregion field is added to the jobspec, as shown in FIG. 4. This job first deploys two instances of the cache group spread between DCs in a "west" region, then 1 instance of the cache group in DCs in the "east" region. If either deployment fails, both get rolled back.

Deployment States

Deployments in single regions have the following states:

Running: A running deployment has been started, is making allocation placements, and waiting for them to be marked healthy. A deployment with a canary with auto_promote=false that is waiting for the user to approve remains in the running state.

Cancelled: When a job is updated while a previous deployment is running, the running deployment is marked as cancelled. The deployment is treated as "terminal" at this point and cannot be changed.

Failed: The deployment has not been marked healthy within the deadline. The deployment is treated as "terminal" at this point and cannot be changed. If auto_rollback=true is set, the workload orchestrator will revert to the previous version of the job. If a second deployment is run before the first deployment has a chance to complete, then it is possible to get into a situation where the second deployment fails and has no instances of the previous deployment to roll back to, leading to the error "no stable job version to auto-revert to" (from which there is no recovery except to re-run a job update).

Paused: The deployment has been manually paused by the user.

Successful: The deployment has made all placements. The deployment is treated as "terminal" at this point and cannot be changed.

To these states, multi-region deployments add a new state: a blocked state. A blocked deployment has completed successfully, but is not the final region in the deployment; the blocked regions will wait to be unblocked by the final region's deployment, at which point they transition to successful. The operator can also unblock a region manually. The interaction between unblocking and partial failures is described in further detail below with reference to partial successes.

In some implementations, a given region within a multi-region deployment is "complete" when it enters the blocked or successful state. A multi-region deployment is "complete" when all regions have transitioned from blocked to successful.

Multi-Region Deployment Steps

When a multi-region job is submitted, a copy of the job is created for each region, interpolated with the region meta block. If any region's job registration fails, the remaining regions continue without it but will be unable to complete unless manually unblocked. Deployments are kicked off in states of either "all at once" or "rolling", and deployments fail either as "isolated region rollback" or "all or nothing."

In some implementations, a field max_parallel can be provided. If this field is unset (or matches the number of regions), the deployments for all regions will begin in the running state. If max_parallel is more than 0 but less than the number of regions, the first n deployments start in the running state. The remainder start in the paused state. Because each region is configured to know where it falls in the list, these values can be set without further coordination.

When one of the running deployments completes (that is, when it would otherwise transition into the successful state), it will set itself to a new blocked state and iterate over the remaining regions that it expects could be paused, querying the deployment state of the region's matching job and sending a Deployment.Pause (with "resume" flag) RPC. When the last deployment completes, it will iterate over all the regions and finalize their deployments via a new Deployment.Unblock RPC. This causes them to transition to successful. If any deployment fails, its deployment watcher can look up the auto_revert strategy and either fail or send Deployment.Fail RPCs to all regions, depending on the configuration. If any region's deployment is cancelled by a new deployment, then the Deployment.Unblock RPC will fail and all regions that have not already transitioned to successful will be marked as cancelled by a new Deployment.Cancel RPC.

In some implementations, the paused state is used as an operator safety mechanism, so that they can debug a deployment or halt one that's causing a wider failure. By using the paused state as the first state of a multi-region deployment, we risked resuming an intentionally operator-paused deployment because of activity in a peer region.

Figure 5:
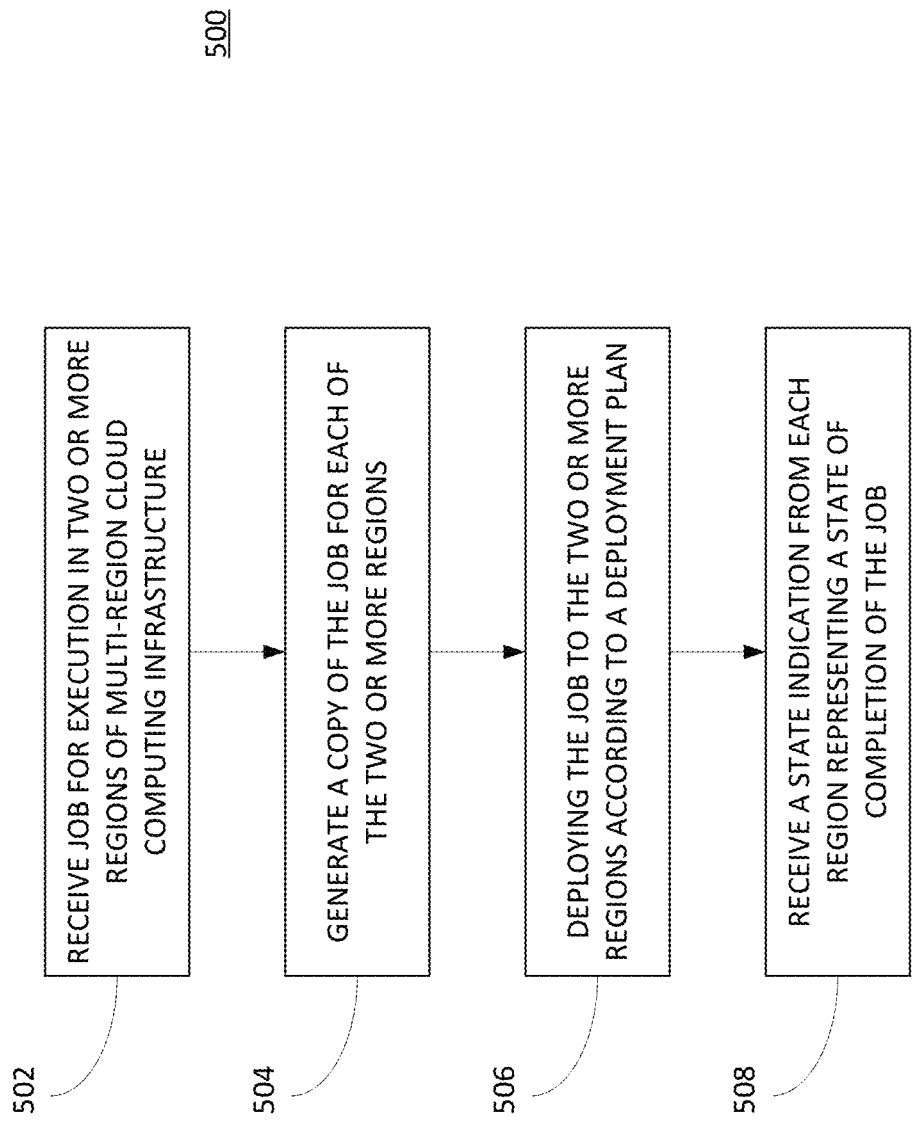
FIG. 5 is a flowchart of a method for multi-region deployment of application jobs in a federated cloud computing infrastructure.

FIG. 5 is a flowchart of a method 500 for multi-region deployment of application jobs in a federated cloud computing infrastructure. At 502, a job for execution in two or more regions of the multi-region cloud computing infrastructure is received by a workload orchestrator system of a multi-region cloud computing infrastructure. Each of the two or more regions are comprised of a collection of servers joined in a raft group for separate, regional execution of the job. At 504, a copy of the job for each of the two or more regions is generated by the workload orchestrator system. At 506, a workload orchestrator server of the workload orchestrator system deploys the job to the two or more regions, the workload orchestrator server deploying the job according to a deployment plan. At 508 a state indication is received by the workload orchestrator server from each of the two or more regions, the state indication representing a state of completion of the job by each respective region of the multi-cloud computing infrastructure.

Operator Experience

Planning a job causes the plan to be gathered from all regions and then presented to the operator via the command line interface (CLI) for each region. Because each region has its own state store, a resulting check index for a plan is valid only if the job run is sent to the same region as the job plan. Registering a multi-region job skips a monitor that is normally run, similar to how periodic jobs works. Instead, the evaluation ID is returned for each region.

The job status for a multi-region job includes a new section for multi-region deployments, providing the ID and status for deployments in the other regions. In accordance with some implementations, the deployments for a multi-region job include a new "Region" column, to show the deployments in other regions as well. Querying the status of a specific deployment can include the same multi-region deployment information block as the job status. The deployment ID is specific to a region, so the user still needs to pass the—region flag to query the status of a deployment in another region. If a region's deployment fails (or if the region loses quorum and cannot make progress), and there is no auto_revert strategy set, the operator can intervene to unblock the other regions.

Implementation Details

Job Version Drift

Each region tracks its own auto-incrementing Job Version for jobs, but the initial Job.Register sets the Job Version to be the same for all regions at the time it creates the deployments. This allows deployments to be unblocked in a single region, without having to coordinate with a different region that might actually be down. This also allows operators to correct the situation that caused a deployment failure in one region and simply rerun the job. Already-successful regions will show no update, whereas previously-failed regions will show a Job Version increment. By allowing for drift, but making an effort to correct it on updates, users who already have jobs with the same ID are allowed to be deployed to multiple regions to "upgrade" to multi-region jobs.

Adding/Removing Regions to Jobs

Adding a new region (or turning a single region job into a multi-region job) sends a new job version to each new region as expected. The Job Version in each new region will be 0. If the new region already has a job with the same job ID, the job is overwritten with the multi-region job. This provides an upgrade path for operators. The operator of the region can be sent a warning if encountering this scenario.

Removing a region from a multi-region job stops the job in the removed region. Removing the multi-region configuration from a job stops the job in all regions other than the remaining region where the job was updated, but will warn the user.

Autoscaling

A job scale API is configured to call Job.Register which results in an incremented Job Version. Scale API calls will be interpolated to include the region value, making them specific to the region for which they are called. This will be a frequent source of Job Version drift as described above.

Canary Deployments

A canary deployment is a deployment to a subset of users or servers in a computing network, which allows for testing and monitoring of a new release before a more widespread deployment, such as a multi-region deployment. The term is associated specifically with Microsoft Azure® computing resource deployments, but can also be applied to other cloud computing platforms. A canary deployment can be designated in a workload orchestrator as a field in a multi-region configuration.

In some implementations, users have fine-grained control over single-region deployments with the canary field, which leaves the deployment in a running state but not progressing. In multi-region deployments, the canary field for updates will impact a single region's deployment at a time, and if the auto_promote field is not set, the user can use a deployment promote field for each region in-turn. A deployment waiting for promotion effectively halts the multi-region deployment because the waiting deployment never exits the running state.

Access Control Lists (ACLs)

ACLs are used to secure access to the user interfaces (UIs), application programming interfaces (APIs), command line interfaces (CLIs), service communications and agent communications within each datacenter of the multi-region architecture. Consistent with implementations described herein, ACLs are scoped to a region or global (i.e. all regions of a multi-region implementation). Running a multi-region job requires having ACLs with a global scope. In some implementations, ACLs can be scoped to multiple specific regions instead of all regions, particularly when adding and removing regions to a multi-region job.

Service Discovery

In a specific implementation, a workload orchestrator such as Nomad® includes a service discovery feature, which relies on a networking tool such as Consul®. For example, Consul® datacenters roughly map to Nomad® regions, and the recommended production multi-region deployment has each Nomad® region registered with one Consul® datacenter. Some jobs that use template stanzas can work as-is in a multi-region scenario; by default, traffic between allocations will be within a Nomad® region and users can opt-in to querying across Consul® datacenters to set up cross-region traffic. The region-specific metadata can be merged with the job-level meta block so that it can be interpolated as for other metadata.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for multi-region deployment of application jobs in a federated cloud computing infrastructure, the method comprising:
    receiving, by a workload orchestrator system of a multi-region cloud computing infrastructure, a job for execution in two or more regions of the multi-region cloud computing infrastructure, each of the two or more regions comprising a collection of servers joined in a raft group for separate, regional execution of the job;
    generating, by the workload orchestrator system, a copy of the job for each of the two or more regions;
    deploying, by a workload orchestrator server of the workload orchestrator system, the job to the two or more regions, the workload orchestrator server deploying the job according to a deployment plan; and
    receiving, by the workload orchestrator server, a state indication from each of the two or more regions, the state indication representing a state of completion of the job by each respective region of the multi-cloud computing infrastructure.

2. The method in accordance with claim 1, wherein the deployment plan includes an order in which the job is to be executed by each of the two or more regions.

3. The method in accordance with claim 2, wherein the order is parallel among the two or more regions.

4. The method in accordance with claim 2, wherein the order specifies a sequence for executing the job among the two or more regions.

5. The method in accordance with claim 1, wherein deploying the job to the two or more regions further includes transmitting a block to at least one of the two or more regions, and wherein the block inhibits execution of the job until non-blocked regions successfully execute the job.

6. The method in accordance with claim 1, wherein the job for execution in two or more regions of the multi-region cloud computing infrastructure is represented in a code that designates the job and the two or more regions, the code being received from a user by the workload orchestrator system.

7. A federated cloud computing infrastructure platform for multi-region deployment of application jobs, the cloud computing infrastructure comprising:
    a processor; and
    a non-transitory computer readable medium having instructions embodied thereon that when executed by the processor causes the processor to perform processes comprising:
        receiving a job for execution in two or more regions of the federated cloud computing infrastructure, each of the two or more regions comprising a collection of servers joined in a raft group for separate, regional execution of the job;
        generating a copy of the job for each of the two or more regions;
        deploying the job to the two or more regions, the workload orchestrator deploying the job according to a deployment plan; and
        receiving a state indication from each of the two or more regions, the state indication representing a state of completion of the job by each respective region of the multi-cloud computing infrastructure.

8. The cloud computing infrastructure in accordance with claim 7, wherein the deployment plan includes an order in which the job is to be executed by each of the two or more regions.

9. The cloud computing infrastructure in accordance with claim 8, wherein the order is parallel among the two or more regions.

10. The cloud computing infrastructure in accordance with claim 8, wherein the order specifies a sequence for executing the job among the two or more regions.

11. The cloud computing infrastructure in accordance with claim 7, wherein the processes performed by the processor further comprise:
    transmitting a block to at least one of the two or more regions, wherein the block inhibits execution of the job until non-blocked regions successfully execute the job.

12. The cloud computing infrastructure in accordance with claim 7, wherein the job for execution in two or more regions of the federated cloud computing infrastructure is represented in a code received by a user that designates the job and the two or more regions.

13. A system for multi-region deployment of application jobs in a federated cloud computing infrastructure, the method comprising:
    a workload orchestrator system associated with the federated cloud computing infrastructure, the workload orchestrator system being configured to receive a job for execution in two or more regions of the multi-region cloud computing infrastructure, each of the two or more regions comprising a collection of servers joined in a raft group for separate, regional execution of the job, the workload orchestrator system further being configured to generate a copy of the job for each of the two or more regions; and
    a workload orchestrator server of the workload orchestrator system, the workload orchestrator server being configured to deploy the job to the two or more regions, and to deploy the job according to a deployment plan, the workload orchestrator server further being configured to receive a state indication from each of the two or more regions, the state indication representing a state of completion of the job by each respective region of the multi-cloud computing infrastructure.

14. The system in accordance with claim 13, wherein the deployment plan includes an order in which the job is to be executed by each of the two or more regions.

15. The system in accordance with claim 14, wherein the order is parallel among the two or more regions.

16. The system in accordance with claim 14, wherein the order specifies a sequence for executing the job among the two or more regions.

17. The system in accordance with claim 13, wherein deploying the job to the two or more regions further includes transmitting a block to at least one of the two or more regions, and wherein the block inhibits execution of the job until non-blocked regions successfully execute the job.

18. The system in accordance with claim 13, wherein the job for execution in two or more regions of the multi-region cloud computing infrastructure is represented in a code that designates the job and the two or more regions, the code being received from a user by the workload orchestrator system.

* * * * *